UNITED STATES PATENT OFFICE.

JOSIAH DAILY, OF MADISON, INDIANA.

FLAVORING EXTRACT FOR SIRUP AND SUGAR.

SPECIFICATION forming part of Letters Patent No. 261,315, dated July 18, 1882.

Application filed June 1, 1882. (Specimens.)

*To all whom it may concern:*

Be it known that I, JOSIAH DAILY, of Madison, in the county of Jefferson and State of Indiana, have invented a new and useful Improvement in Sirups and Sugars, of which the following is a full, clear, and exact specification.

The object of my invention is to give to sirups and sugars the flavor of maple.

In preparing my improved sirup I make a decoction of hickory bark or wood, and add about three table-spoonfuls of the same to a gallon of heated or boiling sirup.

The bark may be ground to facilitate the extraction of its principle, and the extract may be made more or less strong by increasing or diminishing the quantity of bark or wood, or by boiling the extract for a longer or shorter time. Of course the stronger the extract the less the quantity required for flavoring a given amount of sirup.

The sap of the hickory may just as well be used; but it is more difficult to obtain.

The sirup may be manufactured from any kind of sugar; or the sirups ordinarily found in the market may be used.

The effect of the extract or decoction is to give to the sirup the flavor of the maple, producing a sirup which cannot be distinguished from genuine maple-sirup.

The high price of maple-sirup, as well as its scarcity throughout the country, renders this improved sirup of great value, since a good substitute for maple-sirup is thus produced, which comes within the reach of all.

It is evident that the sirup may be boiled down, and a sugar resembling maple-sugar in taste may be produced. I therefore do not confine myself to any exact proportions of the ingredients used, because all depends upon the strength of the decoction; and I propose to use the extract wherever the flavor of the maple would be desirable.

I am aware that a decoction made from the wood of the maple has been used for giving a maple flavor to sirup and sugar; but the maple belongs to an entirely different genus from that of the hickory, and would therefore no more suggest the use of hickory for such a purpose than it would that of the oak or any other bitter wood. A claim to the use of maple-wood could not, with any propriety, be expanded to include the use of all woods, for it is well known that the sap of trees in general would not answer the purpose proposed, since that of some trees is decidedly unpleasant, if not positively disagreeable and nauseous. To ascertain that a decoction of hickory will produce the flavor of sugar-maple is therefore an independent discovery, which could have been arrived at not by inference but by experiment only, while the use of maple would be obviously suggested by the fact that it belongs to the same genus with the sugar-maple itself. Furthermore, the bark of a tree has never before been used in this art; but the woody part only, to the exclusion of the bark. This, at any rate, requires the destruction of the tree. On the contrary, I have found that the outside bark of the shell-bark hickory will produce the desired effect, and the advantage of this is that the outside bark may be chipped off without injuring the tree.

Having thus described my invention, what I claim, and desire to secure by Letters Patent, is—

An improved sirup or sugar, consisting of any ordinary sirup or sugar flavored with an extract of hickory, substantially as described.

JOSIAH DAILY.

Witnesses:
 A. G. LYNE,
 SOLON C. KEMON.